(12) United States Patent
Gustafsson et al.

(10) Patent No.: US 6,751,997 B1
(45) Date of Patent: Jun. 22, 2004

(54) STAMPING PRESS ARRANGEMENT AND METHOD

(75) Inventors: Olle Gustafsson, Karlskoga (SE); Lars-Erik Dahl, Karlskoga (SE)

(73) Assignee: Hydropulsor AB, Karlskoga (SE)

( * ) Notice: Subject to any disclaimer, the term of this patent is extended or adjusted under 35 U.S.C. 154(b) by 0 days.

(21) Appl. No.: 10/110,860

(22) PCT Filed: Oct. 19, 2000

(86) PCT No.: PCT/SE00/02020

§ 371 (c)(1), (2), (4) Date: Aug. 22, 2002

(87) PCT Pub. No.: WO01/28723

PCT Pub. Date: Apr. 26, 2001

(30) Foreign Application Priority Data

Oct. 19, 1999 (SE) ................................. 9903751

(51) Int. Cl.[7] .............................................. B21D 28/00
(52) U.S. Cl. ............................. 72/339; 72/337; 72/331
(58) Field of Search .......................... 72/339, 331, 330, 72/326, 325, 337

(56) References Cited

U.S. PATENT DOCUMENTS

| 1,884,476 A | * | 10/1932 | Woodings | ................ | 72/331 |
|---|---|---|---|---|---|
| 3,116,542 A | * | 1/1964 | Niekamp | ................ | 72/325 |
| 3,253,451 A | * | 5/1966 | Kerns | ................ | 72/331 |
| 3,638,712 A |   | 2/1972 | Rudov | ................ | 72/331 |
| 3,759,079 A | * | 9/1973 | Nowak | ................ | 72/330 |
| 4,165,629 A | * | 8/1979 | McCabe | ................ | 72/325 |
| 4,175,417 A | * | 11/1979 | Vergnani et al. | ................ | 72/356 |
| 4,713,960 A | * | 12/1987 | Gassaway | ................ | 72/412 |

FOREIGN PATENT DOCUMENTS

| DE | 19648485 |   | 5/1998 |   |   |
|---|---|---|---|---|---|
| GB | 22904 | * | of 1900 | ................ | 72/330 |
| GB | 1066424 |   | 4/1967 |   |   |
| WO | 97/00751 |   | 1/1997 |   |   |

* cited by examiner

Primary Examiner—Daniel C. Crane
(74) Attorney, Agent, or Firm—Dilworth & Barrese LLP

(57) ABSTRACT

Stamping press arrangement, comprising an impact member (3), a supporting member (4) and a movably arranged cutting tool (5), the impact member (3) being arranged to perform at least one striking movement against the cutting tool (5) for cutting a blank (1) being held by the supporting member (4). The stamping press arrangement comprises a moulding tool (7) for moulding a segment (2) cut from said blank (1) and that the impact member (3) is arranged also to influence the moulding tool (7).

20 Claims, 2 Drawing Sheets

STAMPING PRESS ARRANGEMENT AND METHOD

FIELD OF THE INVENTION

The present invention is related to a stamping press arrangement, comprising an impact member, a supporting member and a movably arranged cutting tool, the impact member being arranged to perform at least one striking movement against the cutting tool for cutting a blank being held by the supporting member.

The invention is also related to a method for cutting a blank and moulding a segment of the blank obtained by a previous cutting.

The invention is especially applicable at arrangements for cutting and machining of metallic material by adiabatic softening of the metallic material. Typical such arrangements comprise stamping press machines for cutting metal bars or metal wire into shorter segments.

Such machines normally comprise an impact member in the shape of an impact piston, which by means of a striking movement achieves a cutting or compacting of an object. The impact piston may be spring operated, operated by means of compressed air or preferably by means of hydraulics. The kinetic energy which by such a stroke is directed against a blank or a body, which for instance shall be cut, is so large that so called adiabatic softening or coalescence arises in the material. Thereby a very efficient machining, e.g. cutting, of the blank or the body can be achieved with a minimum of cracks, material changes or similar in the material.

BACKGROUND OF THE INVENTION

In connection with cutting bodies or blanks into smaller or shorter segments, where the cutting is performed by a stroke by means of an impact member, e.g. an impact piston, being directed against a cutting tool for cutting the body or the blank it is not unusual with a more or less prominent deformation of the blank and/or the segment cut therefrom in the area where the cutting tool has influenced the blank and accomplished the actual cutting. When cutting for instance bars with circular cross section it is for instance not unusual that a somewhat deformed cross section, that is a not completely circular cross section, is obtained at the cutting area. In the cases when such deformations cannot be accepted, accordingly, a subsequent moulding of segments which have been cut and somewhat deformed in the manner described above is required. In cases with segments of metallic materials, e.g. bar segments, the moulding is suitably performed by placing the segment in a moulding tool, in which it is moulded by pressing, e.g. cold pressing.

The abovementioned is valid also when cutting metallic materials, where stamping machines and tools for cutting perform cutting by adiabatic softening of the material in question. This cutting technique enables very fast cutting of long blanks preferably bars or wire, into a large number of shorter segments. A large number of segments which each require moulding are thereby obtained in a short time. To make the cutting industrially applicable it is important that subsequent moulding of cut segments can be done in a manner being as cost efficient and fast as possible. In order not to create bottlenecks in an industrial process utilizing this type of cutting, it is desirable that the moulding procedure can be carried out with high velocity, preferably with substantially the same velocity as the cutting procedure.

OBJECT OF THE INVENTION

An object of the present invention is to provide a stamping press arrangement being arranged to, in a cost efficient manner, perform cutting of an object or a blank and subsequently perform required moulding of segments obtained by the cutting. The moulding of said segments is to be possible to take place with substantially the same frequency as the one the original body or blank is cut into segments with. The construction of the arrangement shall promote production of single segments with high accuracy with reference to the production velocity and the shape of the obtained segments.

SUMMARY OF THE INVENTION

The object of the invention is achieved by means of a stamping press arrangement of the initially defined kind, which is characterized in that it comprises a moulding tool for moulding a segment cut from said blank and that the impact member is arranged also to influence the moulding tool during said striking movement for moulding said segment.

The segment which is moulded in the molding tool is a segment cut at a previous striking movement of the impact member. Preferably, said segment is cut at the most previous striking movement of the impact member. The moulding tool is suitably arranged to receive the most recently, by means of cutting, obtained segment by this being fed into the moulding tool and in connection with that pushes the latest moulded segment out of the moulding tool. The arrangement therefore preferably comprises means for feeding a cut segment to the moulding tool after the segment has been cut. Preferably, such a means is arranged to feed the blank to be cut forward to suitable cutting position, while the blank thereby in its turn feeds the latest cut segment further to the moulding tool by a displacement movement. The feed takes place between two consecutive cuttings of the blank, i.e. between two consecutive striking movements of the impact member.

According to a preferred embodiment of the arrangement according to the invention the impact member is arranged to hit and influence the cutting tool for initiating the cutting and the moulding tool for achieving the moulding, respectively, sequentially during one and the same striking movement, the impact member initially hitting and influencing the cutting tool and subsequently hitting and influencing the moulding tool. Thereby, the residual energy of the impact member, that is a kinetic energy that the impact member still has after the cutting tool has received the impact from the impact member which generates the cutting, is utilized in an optimal manner. Since the moulding tool will have a damping influence on the further movement of the impact member, the need for additional damping members for damping the striking movement of the impact member is reduced.

The cutting tool and the moulding tool are preferably arranged adjacently. The distance between the tools is determined by the length of the segment 2. The distance between the two tools in the area where a cut segment is transferred from the cutting tool to the moulding tool is preferably substantially shorter than the length of such a segment. The space is arranged in an area where an end of the blank to be cut will be present during the cutting and moulding sequence. Wear between different movable parts, e.g. between the cutting tool and the moulding tool and between the end of the blank to be cut and the moulding tool, is avoided thanks to the space.

The blank to be cut preferably comprises a metallic material, and the influence of the impact member on the cutting tool is effected with such a velocity and force that the metallic material of the blank is subjected to an adiabatic softening resulting in the cutting. The blank is elongated, preferably bar shaped or wire shaped.

The invention is also related to a method of the initially defined kind, which is characterized in that the cutting and moulding is done by a stroke by means of an impact member being directed against a cutting tool for cutting the blank and a moulding tool for moulding said segment, and that the cutting and moulding are achieved by one and the same striking movement of the impact member.

Further advantages with and features of the invention will be apparent from the following description and the appended claims.

BRIEF DESCRIPTION OF THE DRAWINGS

An embodiment of the stamping press arrangement according to the invention will hereinafter be described for exemplifying purpose with reference to the appended drawings, in which.

DETAILED DESCRIPTION OF A PREFERRED EMBODIMENT

Figure 1:
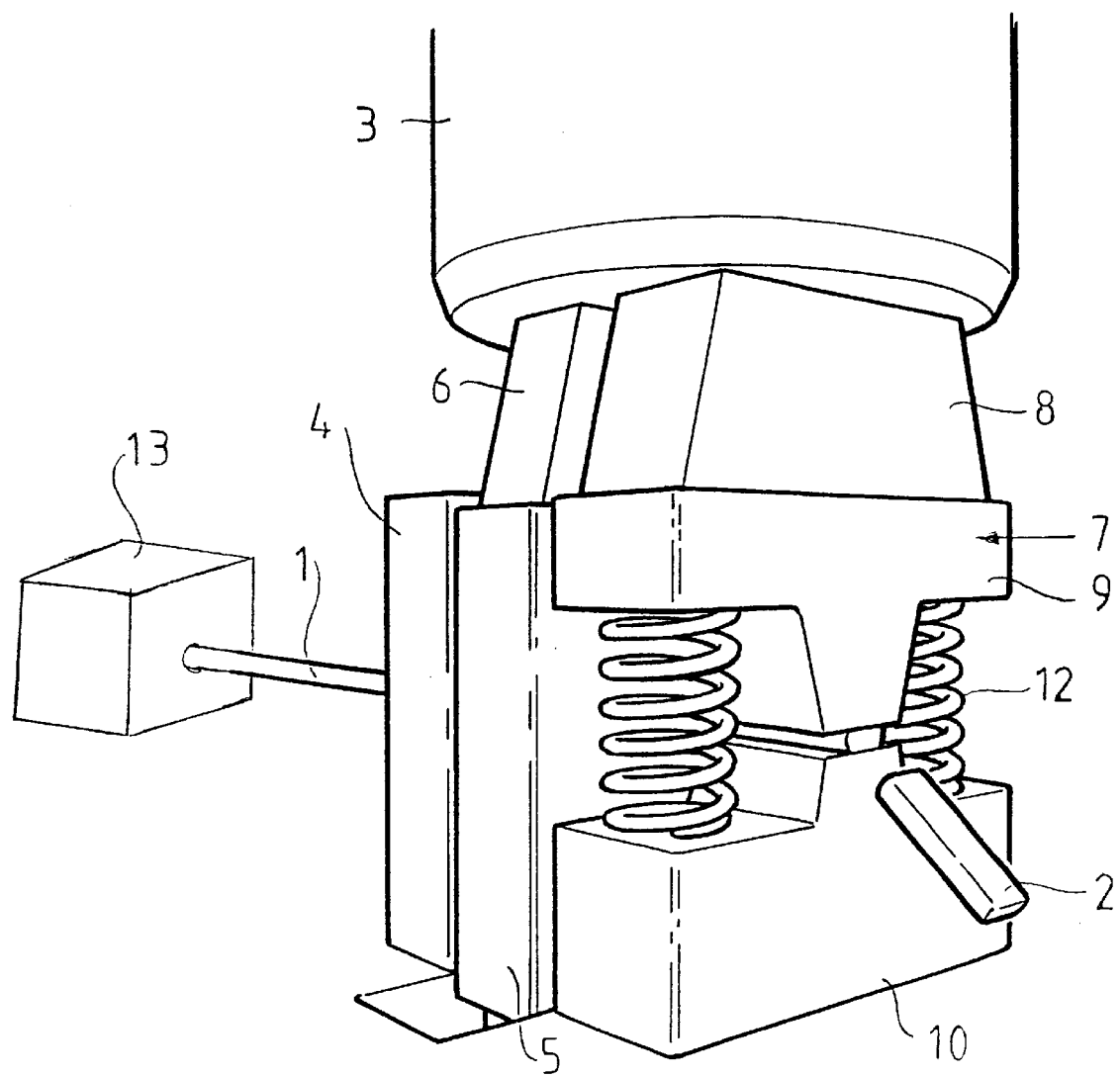
FIG. 1 is a schematic perspective view of an embodiment of the stamping press arrangement according to the invention.
Figure 2:
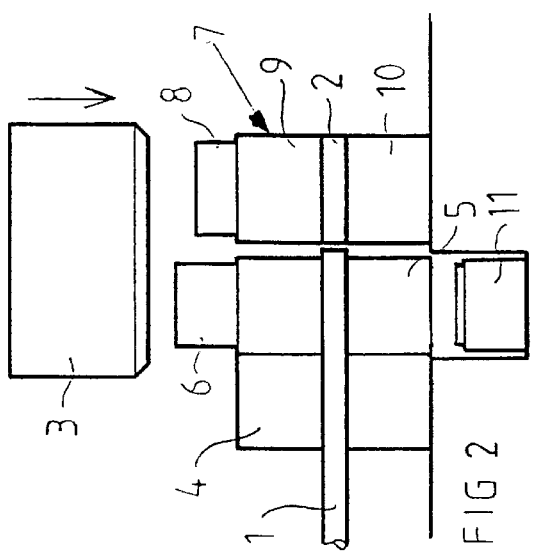
FIGS. 2–5 are cross section views schematically illustrating a cutting and moulding sequence of the stamping press arrangement according to the invention.

The stamping press arrangement according to the invention defines a machine arranged to, by means of impact influence, achieve adiabatic softening of a body or a blank 1 mainly comprising a metallic material, for cutting the blank 1 into separate segments 2.

The arrangement comprises an impact member 3 in the shape of a piston, which can be operated by means of a spring member or pneumatically, but which is preferably hydraulically operated in order to achieve high cutting frequency with the highest possible accuracy. The arrangement is arranged to repeatedly perform striking movements by means of the impact member 3 for cutting the blank 1 into a plurality of segments 2.

The arrangement furthermore comprises a supporting member 4, against which the blank 1 abuts while being cut. In addition, the arrangement comprises a cutting tool 5, which is movably arranged relative to the supporting member 4. Alternatively, the supporting member 4 and the cutting tool 5 can be considered as parts of one single cutting tool, where one part 4 is substantially immovable and the other 5 is movable as seen in the cutting direction.

The impact member 3 is arranged to hit the cutting tool 5 during a striking movement, impart an impact thereon and displace it such that adiabatic softening arises in the blank 1, resulting in said cutting. In the illustrated embodiment an impact cap 6 is connected to the cutting tool 5, the impact member 3 hitting the impact cap 6 and thereby achieving the displacement of the cutting tool 5.

In addition, in parallel with the cutting tool 5 a moulding tool 7 is arranged for moulding by pressing segments 2 which have been cut from the blank 1 by means of the cutting tool 5.

The impact member 3 is arranged to hit the moulding tool 7 or a part 8 connected thereto for generating a movement of at least one movably arranged part 9 of the moulding tool 7. The moulding tool 7 preferably comprises at least one part 9, which is movable in the cutting direction, and at least one part 10, which is substantially immovable in the cutting direction, the impact member 3 influencing and moving the movable part 9 relative to the immovable part 10 during the striking movement for achieving a moulding of a segment 2 cut during a previous sequence. The moulding can be of very simple nature, for instance a curving of an originally substantially straight segment 2 or an adjustment of any portion of the segment 2 which has been deformed in connection with the previous cutting. In the case of cutting a metallic bar blank into shorter segments while generating adiabatic softening, the moulding comprises for instance adjustment of the outer shape of an end of a segment 2, at which end the cutting has resulted in a small but still observable deformation. The moulding tool preferably comprises some stopping means, for instance a shoulder or the like (not shown) to prevent the segment 2 that is being pushed into the moulding tool from being pushed too far during the feed phase. However, this may not obstruct a previously moulded segment 2 from being pushed out.

The cutting and moulding occurs sequentially during one and the same striking movement of the impact member 3. The process is evident from FIGS. 2–5.

The body or the blank 1, which is elongated, preferably bar shaped or wire shaped, is fed into and through the supporting member 4, which moreover comprises a through recess or a hole, the inner dimensions of which substantially corresponding to the outer dimensions of the blank 1 and which is arranged to receive and house the blank 1. The body or the blank 1 is fed so far that a segment 2 of previously determined length will be cut by the movement of the cutting tool 5 relative to the supporting member 4. A segment 2 remaining in the cutting tool 5 since a previous cutting is displaced by influence of the forward fed blank 1 into the moulding tool 7 for moulding therein.

Figure 3:
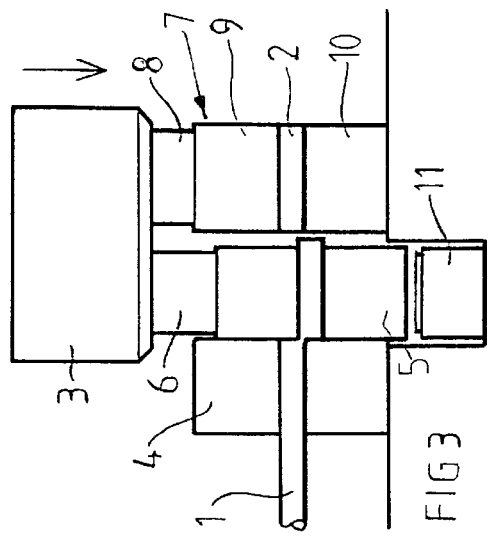
Figure 4:
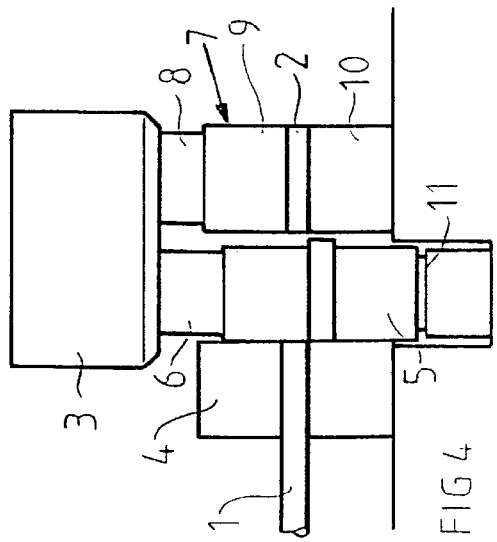
Figure 5:
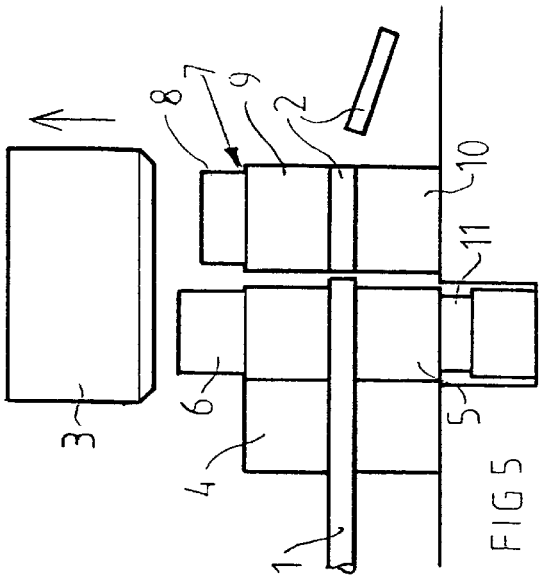

As apparent from FIG. 3, the impact member 3 initially hits the cutting tool 5, or more exactly the impact cap 6 connected thereto, the cutting of the blank being initiated. Energy is supplied to the material in the blank 1 and adiabatic softening arises. Thereby, a further segment 2 is separated from the blank 1.

The movable part 9 of the moulding tool 7, or more exactly the part 8 connected thereto, is arranged displaced relative to the impact cap 6 in the direction of motion of the impact member 3. The impact member 3 is arranged to, in a later stage, only when the cutting of the blank 1 has been initiated and possibly even completed, hit the moulding tool 7 and achieve a mutual movement of the parts 9, 10 thereof such that a moulding of the segment 2 present therein is obtained. This is apparent from FIG. 4.

When the impact member 3 has reached a turning position and returns to an initial position for a further striking movement, the cutting tool 5 and the moulding tool 7 are arranged to return to their respective initial positions for another cutting and moulding sequence. For this purpose the cutting tool comprises a return means 11, preferably a hydraulically operated piston, or, alternatively, a spring device. The return means 11 is driven downwards, e.g. hydraulically, prior to or at the same time as the striking movement of the impact member 3 so as to retard the striking movement as little as possible. This is apparent from FIGS. 2–4. Subsequent to the striking movement it is activated for the return of the impact member 3, as is apparent from FIG. 5. The moulding tool 7 also comprises a return means 12, arranged to return the movable part 9 to an initial position relative to the immovable part 10 before the next moulding sequence. The return means 12 are here formed by spring members arranged between the movable and immovable parts 9, 10 of the moulding tool 7.

Subsequent to the return of the cutting tool 5 and the moulding tool 7 to said initial position, a new feed of the blank 1 is carried out, the blank 1 being made to displace the segment 2 cut in the previous cutting stage forward to and into the moulding tool. 7, while this segment 2 displaces and feeds out the segment 2 which has been moulded in the moulding tool 7 during the previous sequence.

The arrangement comprises means 13 for feeding the blank 1. The means 13 are in this case only indicated, but it is to be understood that the construction thereof can be of a kind known per se and be simple as well as sophisticated depending on among other things the type of blank to be fed and, above all, on the requirements in the individual case on the accuracy and the quickness of the feed. Preferably, the means 13 comprise a reciprocating hydraulically operated piston with hydraulically operated gripping means. The feed is carried out in one or more steps between consecutive impact sequences, the number of steps depending on the length of the segments 2.

It is to be understood that a plurality of alternative embodiments of the arrangement according to the invention will be apparent to a man with skill in the art without departing from the scope of the invention as defined by the appended claims with support from the description and the drawings.

What is claimed is:

1. Stamping press arrangement, comprising
   an impact member (3),
   a supporting member (4) structured and arranged to support a blank (1) to be cut,
   a movably arranged cutting tool (5), with said impact member (3) structured and arranged to perform at least one striking movement against said cutting tool (5) for cutting the blank (1) being held by said supporting member (4), and
   a molding tool (7) structured and arranged to mold a segment (2) cut from the blank (1), with said impact member (3) also being structured and arranged to influence said molding tool (7) during the striking movement, to thereby mold the segment (2),
   wherein said impact member (3), cutting tool (5) and molding tool (7) are structured and arranged with respect to one another to cut the segment (2) from the blank (1) by a first of two striking movements by said impact member (3) and mold the thus-cut segment (2) by a second of the two striking movements by said impact member (3).

2. The arrangement of claim 1, additionally comprising means (13) for feeding a cut segment (2) to said molding tool (7) after the segment (2) has been cut from the blank (1).

3. The arrangement of claim 2, wherein said means (13) are structured and arranged to feed the thus-cut segment (2) to said molding tool (7) between two consecutive cuttings of the blank (1).

4. The arrangement of claim 1, wherein said impact member (3) is structured and arranged to first hit and influence said cutting tool (5) for cutting the blank (1) and subsequently hit and influence the molding tool (7) for molding a segment (2) previously cut from the blank (1) during one and the same striking movement.

5. The arrangement of claim 1, wherein said cutting tool (5) and molding tool (7) are adjacently arranged with respect to one another, with distance therebetween depending upon length of a cut segment (2).

6. The arrangement of claim 1, wherein the blank (1) comprises metallic material, and
   said impact member (3) is structured and arranged to influence said cutting tool (5) with such velocity and force to subject the metallic material to adiabatic softening resulting in cutting of the blank (1).

7. The arrangement of claim 1, wherein said molding tool (7) comprises a movable part (9) and a substantially immovable part (10), with said impact member (3) structured and arranged to influence and move said movable part (9) relative to said immovable part (10) during striking movement for molding the thus-cut segment (2).

8. The arrangement according to claim 1, structured and arranged to cut and mold segments (2) from an elongated blank (1).

9. The arrangement of claim 8, structured and arranged to cut and mold segments (2) from a bar-shaped or wire-shaped blank (1).

10. The arrangement of claim 2, wherein said impact member (3) is structured and arranged to first hit and influence said cutting tool (5) for cutting the blank (1) and subsequently hit and influence the molding tool (7) for molding a segment (2) previously cut from the blank (1) during one and the same striking movement.

11. The arrangement of claim 3, wherein said impact member (3) is structured and arranged to first hit and influence said cutting tool (5) for cutting the blank (1) and subsequently hit and influence the molding tool (7) for molding a segment (2) previously cut from the blank (1) during one and the same striking movement.

12. The arrangement of claim 2, wherein said cutting tool (5) and molding tool (7) are adjacently arranged with respect to one another, with distance therebetween depending upon length of a cut segment (2).

13. The arrangement of claim 3, wherein said cutting tool (5) and molding tool (7) are adjacently arranged with respect to one another, with distance therebetween depending upon length of a cut segment (2).

14. The arrangement of claim 4, wherein said cutting tool (5) and molding tool (7) are adjacently arranged with respect to one another, with distance therebetween depending upon length of a cut segment (2).

15. The arrangement of claim 5, wherein said cutting tool (5) and molding tool (7) are adjacently arranged with respect to one another, with distance therebetween depending upon length of a cut segment (2).

16. A method for cutting a blank (1) and molding a segment (2) cut from the blank (1), comprising the steps of
   directing a stroke of an impact member (3) against a cutting tool (5) for cutting a segment (2) from the blank (1), and
   directing the same stroke of said impact member (3) against a molding tool (7) for molding a segment (2) previously cut from the blank (1),
   whereby both the blank (1) is cut and the previously-cut segment (2) molded by the same stroke of said impact member (3) against both said cutting tool (5) and molding tool (7).

17. The method of claim 16, comprising the additional step of
   subsequent to the steps of cutting the segment (2) from the blank (1) and molding the previously-cut segment (2) from the blank (1), feeding the blank (1) forwardly to said cutting tool (5) for cutting an additional segment (2) from the blank (1), and
   simultaneously forwarding the segment (2) cut from the blank (1) in the cutting step into the molding tool (7) for molding.

18. The method of claim 16, wherein the blank (1) comprises a metallic material and comprising the additional step of
   providing said stroke of said impact member (3) with sufficient energy to create adiabatic softening of the material upon impact by said cutting tool (5) and thereby cut the blank (1).

19. The method of claim 16, wherein the steps of directing said impact member (3) against said cutting tool (5) and molding tool (7) are performed sequentially.

20. The method of claim 19, wherein said impact member (3) is first directed against said cutting tool (5) to cut the blank (1), and
   at least part of remaining movement and energy of said impact member (3) is directed against said molding member (7) to mold the previously-cut segment (2).

* * * * *